H. V. COULSTON.
GARNET CYLINDER.
APPLICATION FILED MAR. 12, 1919.
1,346,637.  Patented July 13, 1920.
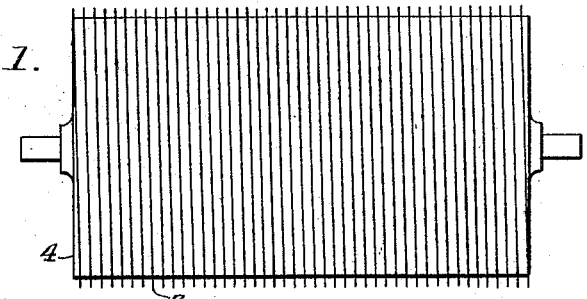
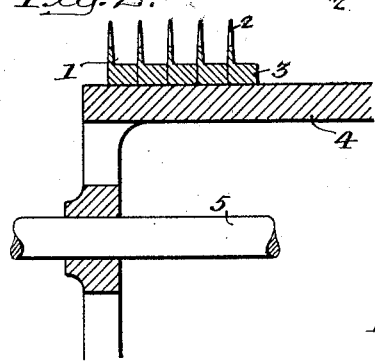
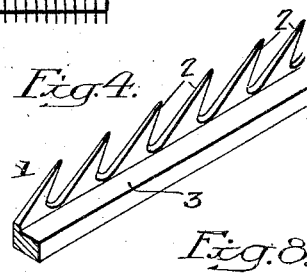
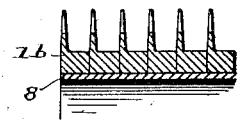
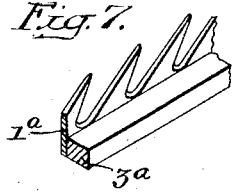
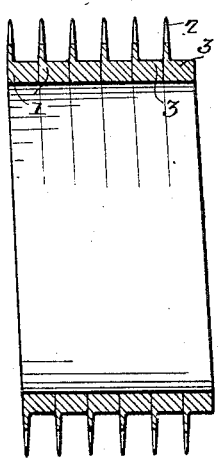
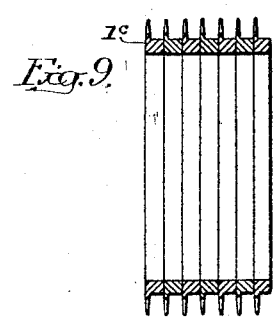
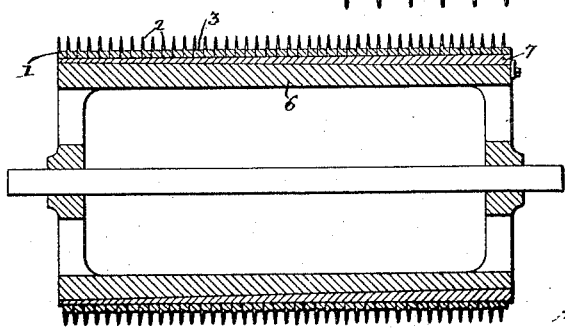
Inventor,
Herbert V. Coulston
by his Attorneys,

UNITED STATES PATENT OFFICE.

HERBERT V. COULSTON, OF PHILADELPHIA, PENNSYLVANIA, ASSIGNOR TO SMITH AND FURBUSH MACHINE COMPANY, OF PHILADELPHIA, PENNSYLVANIA, A CORPORATION OF PENNSYLVANIA.

GARNET-CYLINDER.

1,346,637.     Specification of Letters Patent.     Patented July 13, 1920.

Application filed March 12, 1919. Serial No. 282,246.

*To all whom it may concern:*

Be it known that I, HERBERT V. COULSTON, a citizen of the United States, residing in Philadelphia, Pennsylvania, have invented certain Improvements in Garnet-Cylinders, of which the following is a specification.

One object of my invention is to improve the construction of a garnet cylinder by welding the convolutions of the toothed wire together, or welding a series of assembled rings together, to form a cylinder and thus dispense with the grooving of the supporting cylinder.

A further object of the invention is to make a toothed cylinder from the wire itself which can be moved, when necessary, from a supporting cylinder and replaced by a like toothed cylinder.

Heretofore, it has been the usual practice to cut a spiral groove in a cast metal cylinder, the convolutions of the groove being spaced a given distance apart. Then a strip of flat wire having teeth is forced into the groove and held therein by any suitable means. When the teeth begin to wear the entire cylinder has to be sent to the factory to have the toothed strip removed and another strip driven in its place.

By my invention, all that is necessary is to discard the cylinder consisting of the toothed strip and to substitute a cylinder of like character, which can be kept in stock.

In the accompanying drawings:

Figure 1 is a side view of a garnet cylinder made in accordance with my invention;

Fig. 2 is an enlarged view of a portion of the cylinder, showing the method of assembling the toothed strip on a supporting cylinder before welding;

Fig. 3 is a sectional view of a cylinder consisting of the helically wound strip in which the convolutions are welded together;

Fig. 4 is an enlarged perspective view of a section of the toothed strip;

Fig. 5 is a view of a portion of the toothed cylinder consisting of a series of convolutions of the strip welded together;

Fig. 6 is a sectional view showing one method of retaining the toothed cylinder to the main supporting cylinder;

Fig. 7 is a view showing a separating ring and toothed wire;

Fig. 8 is a view of a modification in which a thin sheet is welded to the toothed wire to form a cylinder, and Fig. 9 is a modification in which the toothed rings are used.

Referring to Fig. 4, 1 is a wire flattened and having teeth 2 of any shape desired, according to the character of the material to be treated. In the present instance, the wire has an offset 3 at one side, which spaces the convolutions of the wire a given distance apart. The wire is coiled tightly upon a forming cylinder 4 mounted on a suitable shaft 5. This may be the final supporting cylinder, or may be merely a temporary support on which the wire is coiled. After the wire is coiled, as in Fig. 2, the convolutions of the wire are welded together at the base by the use of a welding machine, preferably of the roller type, so that, as the cylinder turns, the current will pass through the convolutions of the wire from one pole to the other of the machine, immediately bringing the material of the wire into a welding heat and as pressure is applied causing the convolutions to be firmly welded together. After the convolutions of the strip are welded, if it be desired to remove the cylinder thus formed from the supporting cylinder, this can be accomplished in any suitable manner, and a cylinder made entirely of the coiled strip, as shown in Fig. 3, can be placed on a cylinder of a garnet machine. This cylinder is indicated at 6, and, in this instance, its periphery is slightly tapered from one end to the other and a tapered, split sleeve 7 is introduced between the cylinder 6 and the toothed cylinder. This tapered sleeve can be held by bolts, or other suitable fastenings, so as to retain the toothed cylinder firmly onto the supporting cylinder. Other means of fastening the toothed cylinder to the main cylinder may be resorted to without departing from the essential features of the invention.

In some instances, the wire may be coiled directly upon the supporting cylinder and welded. This is practical where the cylinders can be bodily transferred and where the distance between the factory and the mill in which the machine is used is comparatively short. Where the distance between the factory and the mill is considerable, then the question of freight enters into the situation so that it may be preferable to ship the toothed cylinder and allow the factory employees to remove the worn, toothed cylinder and slip the new cylinder in place.

It will be understood that while I have shown a particular form of wire and teeth of a peculiar character, the shape of the teeth may be varied and the shape of the wire may be modified. In fact, in some instances, the separator $3^a$, Fig. 7, may be made of a separate piece from the toothed wire $1^a$ and the two independent elements may be coiled around the forming cylinder and welded together.

In some instances, a sheet of metal 8 may be used as a support for the toothed cylinder, as in Fig. 8, and this may be welded to the toothed wire $1^b$ at the time the welding of the wire takes place, or afterward. Instead of a coiled wire, separate toothed rings $1^c$ may be used, and these rings may be welded together, as in Fig. 9.

The term "convolutions", as used in the claims, is intended to cover the structurally independent toothed elements shown in Fig. 9, as well as the continuous helical toothed structure shown in Fig. 3.

I claim:

1. A cylinder of a garnet machine made of wire having teeth and having an offset portion at one side of the teeth, the wire being arranged in helical form with the convolutions close together, one convolution being attached to the other by spot welding, forming an integral structure.

2. A garnet cylinder formed of helically wound toothed wire, the wire having an offset portion at the side of the teeth, and the convolutions of the wire being spot welded together to form an integral structure, the spots being distant one from the other so that the welding will not affect the temper of the wire.

3. The combination in a garnet machine, of a supporting cylinder; toothed wire having an offset portion at the side of the teeth wound upon said supporting cylinder, the convolutions of the wire being spot welded together and to the supporting cylinder.

In witness whereof I affix my signature.

HERBERT V. COULSTON.